Aug. 26, 1969 — W. L. SLADE — 3,463,197
WIRE-BRAIDED HYDRAULIC HOSE
Filed June 20, 1966 — 2 Sheets-Sheet 1
FIG. I.
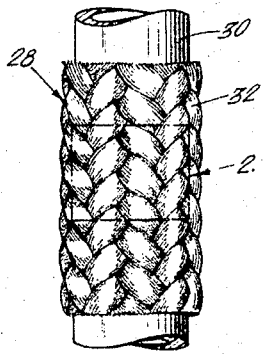
FIG. I<u>a</u> (PRIOR ART)
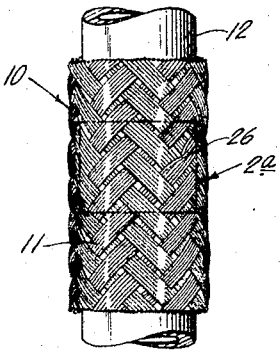
FIG. 2.
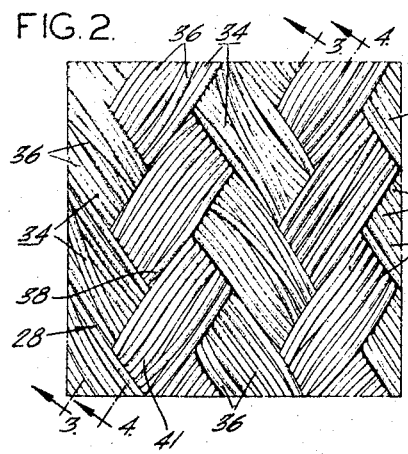
FIG. 2<u>a</u> (PRIOR ART)
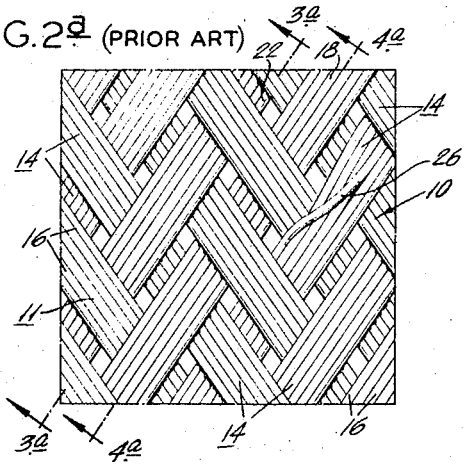
FIG. 3.
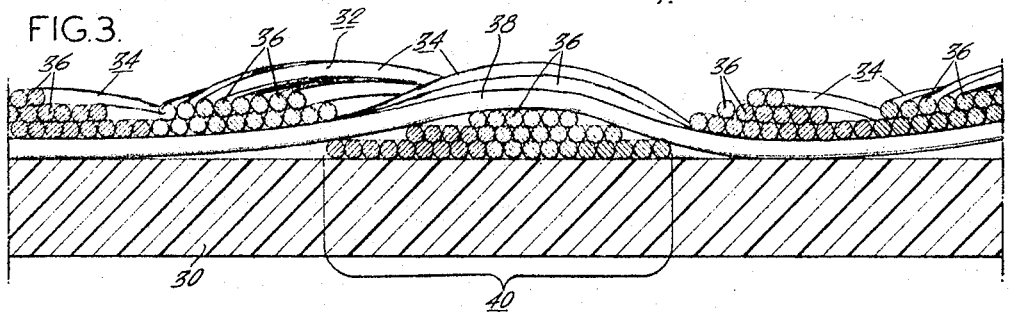
FIG. 3<u>a</u> (PRIOR ART)
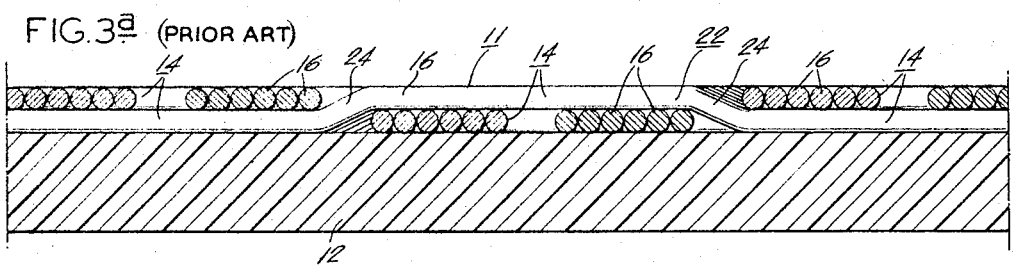
INVENTOR:
WINTON LLOYD SLADE
BY Howson & Howson
ATTYS.

Aug. 26, 1969  W. L. SLADE  3,463,197
WIRE-BRAIDED HYDRAULIC HOSE
Filed June 20, 1966  2 Sheets-Sheet 2
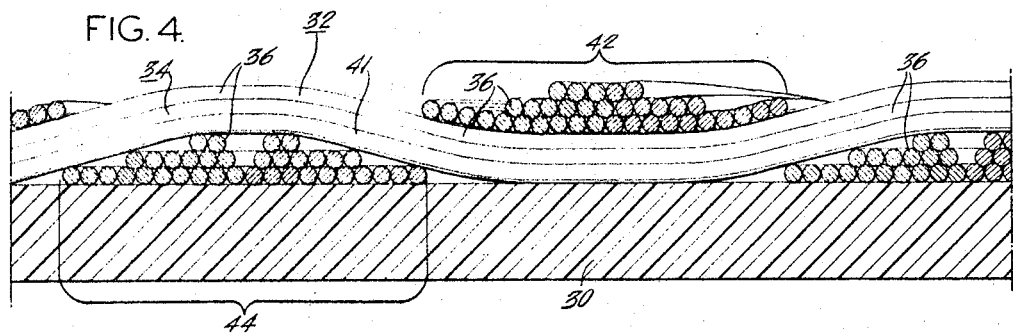
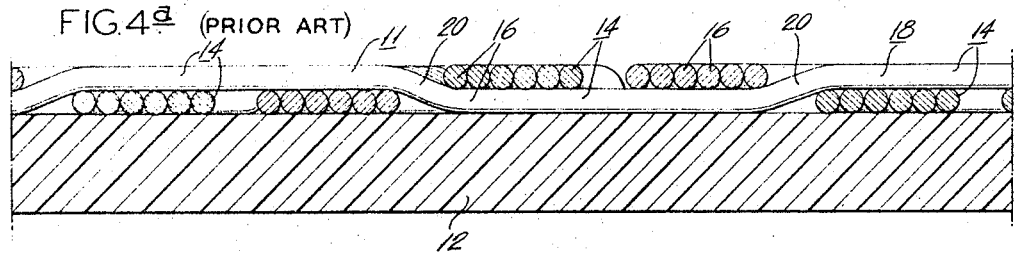
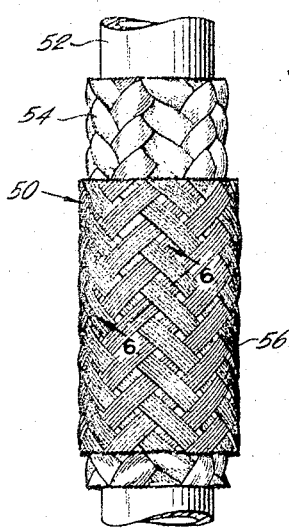
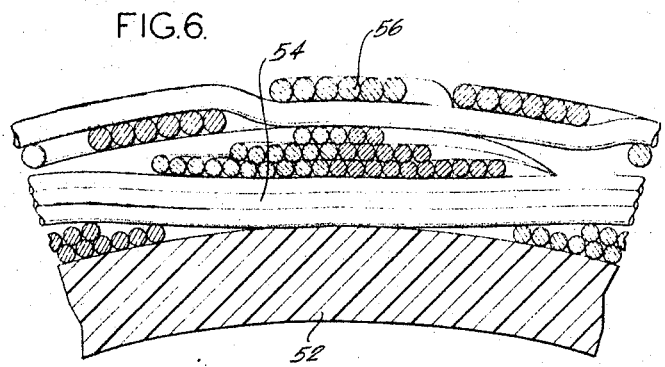
INVENTOR:
WINTON LLOYD SLADE
BY
Howson & Howson
ATTYS.

United States Patent Office 3,463,197
Patented Aug. 26, 1969

3,463,197
WIRE-BRAIDED HYDRAULIC HOSE
Winton Lloyd Slade, Lancaster, Pa., assignor to Raybestos-Manhattan, Inc., Manheim, Pa., a corporation of New Jersey
Filed June 20, 1966, Ser. No. 558,926
Int. Cl. F16l 11/02, 11/14, 11/16
U.S. Cl. 138—125
9 Claims

ABSTRACT OF THE DISCLOSURE

A tubular wire braided hose reinforcement characterized by a plurality of braided strands, each strand including a bundle of small diameter high tensile strength metal wires and filling substantially 100% of the available strand space, each strand having a continuously varying permanent mounded shape adapted to conform with adjacent and parallel transverse strands to provide a smoothly curving disposition of all of the strand wires.

---

The present invention relates generally to wire-braided hydraulic hose and relates more particularly to a novel wire braid construction for hydraulic hose which provides a substantially improved hose static burst and impulse performance.

Hydraulic hoses for high pressure service conventionally comprise a flexible rubber or plastic inner tube surrounded by one or more tubular braids of wire reinforcement. Additional elements such as insulation layers, abrasion-resistant cover, etc., may also be included, but the strength of the hose depends essentially on the wire braid reinforcement. In testing and evaluating hydraulic hose, the primary performance characteristic considered is the hose impulse strength rather than the static burst strength since, in almost every hose application, pressure surges and impulses occur which momentarily stress the hose to a degree exceeding that of the normal static operating pressure of the system.

In recent years, there has been a trend toward increasing the pressures employed in hydraulic systems in order that the size and weight of the overall systems can be reduced. For example, aircraft hydraulic system pressures have been substantially increased in order to achieve overall reduction of the system weight. Higher system pressures naturally demand a stronger hydraulic hose construction to withstand the increased static pressure and impulse conditions.

Failures of hydraulic hose have, in some cases, been traced to the corrosion of the high strength carbon steel reinforcing wire which is commonly used in the reinforcing braids to achieve optimum hose strength. Although substitution of corrosion resistant material such as stainless steel would be desirable, especially in situations in which the hose is subjected to atmospheric corrosion, such substitution would result in a marked loss of fatigue life of the hose, thus reducing the allowable operating pressures and impulse rating.

The present wire-braided hose construction has been developed to fill the need for a reinforced hose having a higher impulse strength than conventionally reinforced hose and which may be frabricated of stainless wire to provide a high strength hose for use under atmospheric conditions which would corrode and weaken the commonly employed carbon steel wire.

The present invention is characterized by a wire braid hose reinforcing wherein the braid strands, contrary to conventional practice, are made up of a plurality of relatively fine wires which, during the braiding process, become arranged in a layered wire bundle which varies in section to accommodate cooperating interwoven strands.

In conventional braid design it has been considered necessary to limit a strand to a single row of parallel wires usually numbering between four and eight which are woven to fill at most 85% of the available space to prevent undue bending of the outer strand wires. The present construction, in utilizing 100% of the available strand space and being characterized by an informally oriented bundle of relatively small diameter wires which become arranged in two or more layers during the braiding process, is a radical departure from the conventional hydraulic hose wire braid reinforcing which will be described more specifically hereinafter.

In view of the above it can be understood to be a first object of the present invention to provide a novel wire braid construction for hydraulic hose which provides an improved static burst and impulse performance over conventional wire braid designs.

A further object of the invention is to provide a wire braid reinforcing as described which is particularly adapted for fabrication from corrosion resistant wire such as stainless steel and hence is resistant to atmospheric corrosion.

An additional object of the invention is to provide a wire braid reinforcing as described which is particularly adapted for fabrication from relatively small diameter high tensile strength wire to provide a stronger hose reinforcing than that of a conventional wire braid of comparable weight.

Still another object of the invention is to provide a wire braid reinforcing as described, the strand wires of which need not be accurately tensioned or aligned during the braiding process.

An additional object of the invention is to provide a wire-braided hydraulic hose as described, the performance of which may be improved by a pre-pressurization process.

A still further object of the invention is to provide a wire-braided hose as described which may be made with conventional braiding equipment.

Still another object of the invention is to provide a wire-braid reinforced hose as described which is characterized by increased flexibility, light weight, and low cost.

Additional objects and advantages of the invention will be more readily apparent from the following detailed description of embodiments thereof when taken together with the accompanying drawings in which:

FIG. 1 is a partial view of a single braided hydraulic hose in accordance with the present invention with the wire braid cut away to show the resilient inner tube;

FIG. 1a is a view similar to FIG. 1 showing a single braided hydraulic hose of a conventional braid construction;

FIG. 2 is an enlarged view of the indicated portion of the wire braid reinforcing of FIG. 1, the wire braid being opened into a flat plane for purposes of illustration;

FIG. 2a is a view similar to FIG. 2 showing in an enlarged view the portion indicated in FIG. 1a of the conventional wire braid reinforcement;

FIG. 3 is a sectional view taken along line 3—3 of FIG. 2;

FIG. 3a is a sectional view taken along line 3a—3a of FIG. 2a;

FIG. 4 is a sectional view taken along line 4—4 of FIG. 2;

FIG. 4a is a sectional view taken along line 4a—4a of FIG. 2a;

FIG. 5 is a view showing a double braided hydraulic hose embodiment wherein the inner braid is in accordance with the present invention while the outer braid is of conventional construction; and FIG. 6 is a partial sectional view taken along line 6—6 of FIG. 5 showing the disposition of the strand wires of the reinforcing braid strands.

Referring to the drawings, FIGS. 1a, 2a, 3a and 4a show a typical conventional wire braided hydraulic hose generally designated 10 which includes a tubular wire reinforcing braid 11 applied to a resilient inner tube 12. As shown most clearly in FIG. 2a, the braid 10 comprises interwoven strands 14 braided in a "two over-two under" manner. Each strand 14 is made up of six wires 16 which are arranged in adjoining parallel relation so that each strand comprises a single flat row or layer of wires. The braided strands are arranged at the "neutral" braid angle of 54°44' to the axis of the hose to prevent axial contraction or elongation of the hose during pressurization.

As noted above and as particularly shown in FIGS. 3a and 4a, each strand passes alternately over two and under two transversely directed strands which causes a deformation of the strand wires between adjacent overlying and underlying transverse strands. For example, in FIG. 4a, which shows the configuration of an inner wire 18 of a strand, a moderate deformation 20 of the wire may be seen in the transition regions at which the wire changes from an underlying to an overlying relation with respect to the transversely directed strands.

In FIG. 3a, the configuration of an outer wire 22 of a strand is shown and it will be noted that the deformations 24 of the outer wire are substantially more pronounced than those of the inner wire 18 due to the pinching effect of the adjacent underlying and overlying transverse strands. The subjecting of the outer wires to sharper bends results in a very slightly longer helical path of the outside wires around the hose and produces a greater stress on these wires with the result that the outer wires of the strands are more prone to impulse failure than the inner wires.

To minimize the stress on the outer wires, the strands are conventionally braided to fill only about 85% of the available space between adjoining strands to provide adequate transition regions for the strand wires. To further minimize the wire deformations, the wire strands invariably comprise a single row or layer of wires which usually number between four and eight. Since, with larger wire a greater deformation and weakening of the strands will occur, and with smaller wire less deformation but also less reinforcing strength will result, it has been empirically determined that an optimum wire size exists for conventional braid reinforcement regardless of the inner tube diameter. Wire of .012" diameter has long been recognized in the art as the optimum size, and high tensile carbon steel wire of this size is extensively used for braided hose construction.

Since the conventional braid design as outlined above has become almost standardized as the optimum design, efforts made to improve the strength of wire-braided hose have mainly been directed to improvements in the braiding of the wires and in particular in maintaining the correct alignment and tensions of the individual strand wires during the braiding process. Should the wire tensions vary during braiding, a "crossover" is apt to occur which, as shown in FIG. 2a at 26, comprises the shifting of a wire, usually an outside wire in a strand, to a new position in the strand. Crossovers are, of course, undesirable in that stresses will be imparted unevenly to the wires of the strand and wire breakage is apt to occur initially at such points. Elaborate devices have been developed in an effort to maintain a uniform tension of each wire of a strand and thus prevent crossovers.

There has been, however, little if any success in improving the braid design to increase the impulse strength of the hose and it has usually been necessary to add a second braid should the strands of a single braid reinforcement be inadequate for a specific purpose. However, due to the lack of extensibility of the high strength wire employed in hose reinforcing, the average efficiency of the second braid is only about 25% and, despite extensive efforts in increasing static burst and impulse performance by adding extra braids, a satisfactory solution has not been found. Should corrosion resistant wire be employed to form the braid strands, the strength of the hose reinforcing would be measurably decreased because of the lower tensile strength and fatigue resistance of the corrosion resistant metal such as stainless steel.

The present invention provides a wire-braided hydraulic hose having a wire braid construction which is a complete departure from the long-established conventional braid arrangement described above. As shown in FIGS. 1–4, a reinforced hose 28 embodying the invention comprises a resilient inner tube 30 over which is applied a tubular wire braid 32. The strands 34 of the braid 32 are formed of a relatively large number of small diameter wires 36, in the present instance 18 wires, which are irregularly arranged in multi-layered bundles. The bundles vary continuously in cross-section, their "mounded" shape resulting from the influence of the adjacent parallel and transverse strands. Because of the mounded bundle shape, the strand wires are not subjected to sharp bends but flow smoothly over and under the transverse mounded strands.

In sharp contrast to the conventional braid design, the present braid strands occupy 100% of the strand space available and, in fact, as shown in FIG. 3, some overlap of adjacent parallel strands on opposite sides of a transverse strand is obtained as the strands broaden out between constricting transverse strands. Furthermore, it has been found that with the present type of braid, uniform tensioning and accurate alignment of the strand wires, while desirable, is not essential. In a multi-layered bundle-type strand, occasional crossovers and misalignments do not appear to materially affect the braid strength, apparently because of the large number of wires and the relative unimportance of any one wire. By means of the multi-layered bundled strand construction, a substantially greater amount of reinforcing wire can be incorporated in a single braid reinforcement with a consequently higher burst and impulse performance than possible with a single conventional braid.

Considering specifically the outer wire 38 of one of the strands 34 as shown in FIG. 3, it will be noted that the wire 38 does not undergo any abrupt deformations but rather follows a smoothly flowing course beneath and over the transversely directed strands. The wire 38 bears against a large number of wires of the transversely directed strands due to the mounded shapes of the strands and thus, even under extreme operating pressures, is not subjected to deforming stresses.

The informal orientation of the strand wires permits adjacent parallel strand portions to combine during the braiding process into a shaped bundle such as shown for example at 40 in FIG. 3 to provide the optimum packing of the wires beneath an overlying strand. In the instance illustrated, the wires are disposed in three rows or layers of decreasing size to fill the space between the inner tube outer surface and the overlying transverse braid.

This effect is also illustrated in FIG. 4 showing a section taken along the middle of a strand 41, the wires of which, in a manner similar to the wires 38 discussed above, are subjected only to gradual smoothly flowing curves. In FIG. 4 it can be seen that an overlying pair of strands have combined in a mounded bundle 42 while a similar combination of adjacent strands is shown in underlying relation at 44. Differences in appearance of the mounded strands can be expected in view of the unregimented condition of the strands during the braiding operation. For example, the bundle 44 differs substantially from the bundle 42 although, in each case, the same desired effect is obtained.

The strands of the present invention are preferably braided at the "neutral" braid angle of 54°44" and in the conventional "two over-two under" manner illustrated. The wire size generally preferred is in the range of .004" to .012" although smaller or larger wires can be utilized effectively. Since hose design with the present invention is not limited to an optimum wire size, the wire diameter may be selected on the basis of the stiffness desired, impulse performance required, availability of special types of wire and similar factors. In general, tensile strengths are progressively and substantially higher in small diameter wires. It is thus possible to achieve in a single braided hose of smaller wire size an impulse rating formerly obtainable only in a two braid hose of conventional design with a saving in both cost and weight. Similarly, the employment of corrosion resistant wire of a small diameter in a hose of the present type, due to the higher tensile strength, produces a hose having a markedly improved impulse performance over that conventionally available.

The wire-braided hose of the present invention can be easily fabricated on conventional wire braiding equipment. The strands of wire are wound onto bobbins in the same manner as in conventional braiding. However, a greater number of ends of wire than are used in producing the prior known flat braid are wound onto each bobbin in order to obtain the desired mounding of the wire bundles. When drawn off the bobbins, the informally arranged strands are shaped by contact with adjacent parallel and transverse strands to form the above described mounded configuration.

The impulse performance of hydraulic hose made with the present wire-braid reinforcing may be substantially increased by a pre-pressurization step following manufacture. This step involves the subjecting of the hose for a relatively short period to a fluid pressure which may be as low as the proof pressure, which is ordinarily twice the working pressure for which the hose is designed, and may be almost as great as the known burst pressure of the hose. The fluid pressure is preferably approximately 50% to 95% of the known burst pressure of the hose and is applied for a period of a few seconds to a minute or more. Such a pre-pressurization substantially increases the impulse life of the hose. Although the cause of the improved performance is not fully understood, there is apparently a realignment of the wires into an optimum pattern which prevents early impulse failure of the wires.

The resilient inner tube 30 may be of conventional rubber or plastic construction. A particularly suitable tube material is polytetrafluoroethylene.

The improved burst and impulse strengths of the present wire braided hose permit, in some cases, the use of a single braided hose of the present design where a multiple-braided hose of conventional construction would normally be required. However, the burst and impulse performance of the present hose can be improved by the application of additional braid, either of the same or conventional construction. Special situations may exist wherein a second braid is employed for other purposes such as to provide better fitting attachment or to add pull strength to the hose.

In FIGS. 5 and 6, a multiple-braid hydraulic hose 50 is shown comprising a resilient inner tube 52 around which is applied a tubular inner braid 54 in accordance with the present invention, and a tubular outer braid 56 of conventional braid construction. The sectional view of FIG. 6 clearly reveals the contrast between the smoothly curved wires of the novel inner braid and the abruptly deformed wires of the conventional outer braid.

In summary, the present braid design, due to the novel multilayered strand bundle construction, permits a greater amount of wire reinforcing in a single wire braid than is possible in conventional braid construction with a consequent improvement in the static burst and impulse performance of the hose. The preferred employment of wires of smaller than normal diameter further increases the hose burst and impulse strength due to the higher tensile strength of the smaller diameter wire. An additional benefit of the use of relatively small diameter wire is an improved flexibility of the wire-reinforced hose.

As indicated above, the present braid is readily adaptable for multi-braid hose reinforcing and is, of course, adaptable for combination with insulation layers, sealing layers and abrasion resistant covers in a conventional manner. Since the individual wire tension and alignment is not critical, the fabrication of the braid is relatively simple and reinforced hose utilizing the present braid construction can be economically manufactured.

Manifestly, changes in details of construction can be effected by those skilled in the art without departing from the spirit and scope of the invention as defined in and limited solely by the appended claims.

I claim:
1. A tubular wire braided hydraulic hose reinforcement comprising a plurality of braided strands, each strand comprising a multi-layered bundle of randomly arranged small diameter high tensile strength metal strand wires, said strands filling substantially 100% of the availstrand space, each strand having a permanent mounded configuration characterized by a continuous substantially repetitive variation in cross section conforming to the curvature of the adjacent transverse strands to thereby provide a smoothly curving disposition of all of the strand wires wherein each strand wire continuously and smoothly curves along its length to conform to said mounded configuration.

2. A wire-braid reinforced hydraulic hose comprising a resilient inner tube, and a tubular wire braid reinforcement around the exterior surface of said tube, said reinforcement comprising a plurality of braided strands, each strand comprising a multi-layered bundle of randomly arranged small diameter high tensile strength metal strand wires, said strands filling substantially 100% of the available strand space, each strand having a permanent mounded configuration characterized by a continuous substantially repetitive variation in cross section conforming to the curvature of the adjacent transverse strands to thereby provide a smoothly curving disposition of all of the strand wires wherein each strand wire continuously and smoothly curves along its length to conform to said mounded configuration.

3. A hydraulic hose as claimed in claim 2 wherein said resilient inner tube is formed of a plastic material.

4. A hydraulic hose as claimed in claim 3 wherein said inner tube plastic material is polytetrafluoroethylene.

5. A hydraulic hose as claimed in claim 2 wherein said strand wires are realigned by application of fluid pressure to the hose, whereby an improved impulse performance of the hose is obtained.

6. A hydraulic hose according to claim 5 wherein the fluid pressure is from about 50% to about 95% of the burst pressure of the hose.

7. A wire-braid reinforced hydraulic hose comprising a resilient inner tube, a first tubular wire-braid reinforcement around the exterior surface of said tube, and a second tubular wire-braid reinforcement overlying said first reinforcement, said first reinforcement comprising a plurality of braided strands, each strand comprising a multi-layered bundle of randomly arranged small diameter high tensile strength metal strand wires, said strands filling substantially 100% of the available strand space, each strand having a permanent mounded configuration characterized by a continuous substantially repetitive variation in cross section conforming to the curvature of the adjacent transverse strands to thereby provide a smoothly curving disposition of all of the strand wires wherein each strand wire continuously and smoothly curves along its length to conform to said mounded configuration.

8. A hydraulic hose as claimed in claim 7 wherein said wire-braid reinforcements are realigned by application of a fluid pressure to the hose, whereby an improved impulse performance of the hose is obtained.

9. A hydraulic hose according to claim 8 wherein the fluid pressure is from about 50% to about 95% of the burst pressure of the hose.

References Cited

UNITED STATES PATENTS

| | | | |
|---|---|---|---|
| 1,021,014 | 3/1912 | Subers | 138—124 |
| 1,316,772 | 9/1919 | Crane | 87—6 |
| 1,425,148 | 8/1922 | Subers | 138—126 X |
| 2,829,671 | 4/1958 | Ernst et al. | 138—127 X |
| 2,932,065 | 4/1960 | Jenkins | 138—125 X |
| 3,078,755 | 2/1963 | Chace | 87—6 X |
| 3,245,431 | 4/1966 | Coe | 138—125 |
| 3,310,447 | 3/1967 | Matthews | 138—125 X |

LAVERNE D. GEIGER, Primary Examiner

EDWARD J. EARLES, Assistant Examiner

U.S. Cl. X.R.

87—9